US010533482B2

(12) United States Patent
Bek et al.

(10) Patent No.: US 10,533,482 B2
(45) Date of Patent: Jan. 14, 2020

(54) METHOD AND APPARATUS FOR HANDLING EXHAUST GAS

(71) Applicant: Azen Manufacturing Pte Ltd, Singapore (SG)

(72) Inventors: Kheng Lee Bek, Singapore (SG); Chee Meng Tan, Singapore (SG)

(73) Assignee: Azen Manufacturing Pte Ltd, Singapore (SG)

( * ) Notice: Subject to any disclaimer, the term of this patent is extended or adjusted under 35 U.S.C. 154(b) by 0 days.

(21) Appl. No.: 15/129,163

(22) PCT Filed: Mar. 26, 2015

(86) PCT No.: PCT/SG2015/000096
§ 371 (c)(1),
(2) Date: Sep. 26, 2016

(87) PCT Pub. No.: WO2015/147751
PCT Pub. Date: Oct. 1, 2015

(65) Prior Publication Data
US 2017/0284271 A1    Oct. 5, 2017

(30) Foreign Application Priority Data

Mar. 26, 2014  (SG) .............. 10201400986P (51) Int. Cl.
*F01N 13/08*    (2010.01)
(52) U.S. Cl.
CPC ........ *F01N 13/082* (2013.01); *F01N 2260/06* (2013.01); *F01N 2270/02* (2013.01)

(58) Field of Classification Search
CPC ........ F01N 3/2892; F01N 3/34; F01N 13/082; F01N 13/102
See application file for complete search history.

(56) References Cited

U.S. PATENT DOCUMENTS

| | | | |
|---|---|---|---|
| 3,017,747 A | | 1/1962 | Steele |
| 3,210,161 A | * | 10/1965 | Soltau ............... F01N 3/26 422/168 |
| 3,413,803 A | * | 12/1968 | Rosenlund ......... F01N 3/26 60/274 |
| 3,525,474 A | * | 8/1970 | Mills ............... F02C 7/057 15/409 |
| 3,633,368 A | * | 1/1972 | Rosenlund ......... F01N 3/26 60/323 |
| 3,712,065 A | | 1/1973 | Hurst |
| 3,839,862 A | * | 10/1974 | Gota ............... F01N 3/26 60/282 |

(Continued)

OTHER PUBLICATIONS

Diven, Gregory, "International Search Report" for PCT/SG2015/000096 dated Jul. 20, 2015, 4 pages.

*Primary Examiner* — Long T Tran
(74) *Attorney, Agent, or Firm* — Winstead PC (57) ABSTRACT

An exhaust handling system comprising: an exhaust pipe having an exhaust outlet, said exhaust outlet having a nozzle arranged to vent exhaust gas; at least one acceleration jet arranged to project an air flow at a velocity head greater than that of the vented exhaust gas; wherein the at least one acceleration jet and exhaust outlet are positioned to project the air flow so as to impinge on a path of said vented exhaust gas, and consequently transfer velocity head to the vented exhaust gas.

19 Claims, 14 Drawing Sheets

(56) References Cited

U.S. PATENT DOCUMENTS

| | | | | |
|---|---|---|---|---|
| 4,172,362 | A | * | 10/1979 | Mizuno ................... F01N 3/26 60/278 |
| 4,663,934 | A | * | 5/1987 | Sickels ................ F01N 3/0211 422/176 |
| 4,912,927 | A | * | 4/1990 | Billington ................ F01N 1/14 60/315 |
| 5,282,361 | A | * | 2/1994 | Sung .................... F01N 13/082 60/315 |
| 5,836,152 | A | | 11/1998 | Schatz |
| 5,941,069 | A | * | 8/1999 | Heath ...................... F01N 1/18 60/307 |
| 6,308,740 | B1 | * | 10/2001 | Smith ...................... F02C 7/04 137/892 |
| 7,281,530 | B2 | * | 10/2007 | Usui ............... F02M 35/10222 123/568.11 |
| 7,707,828 | B2 | * | 5/2010 | Leseman ............... F01N 13/082 |
| 2008/0060355 | A1 | | 3/2008 | Evulet |
| 2013/0305696 | A1 | | 11/2013 | Loman |

* cited by examiner

METHOD AND APPARATUS FOR HANDLING EXHAUST GAS

FIELD OF INVENTION

The invention relates to a method and apparatus for the handling of exhaust gas such as used for engine and other plant associated with oil well drilling rigs or production platforms. The invention may be suitable for applications in other vicinities such as the power generation plants, pharmaceutical plants, petrochemical plants, etc.

BACKGROUND

Internal combustion engines are commonly used to generate energy for industrial activities. Exposure to the exhaust gases from such engines poses health issues for workers and maintenance issues for other equipment in the vicinity. For instance, offshore structures such as oil well drilling rigs or production platforms seem particularly susceptible to contamination of working and other inhabited areas with internal combustion exhaust gases. Therefore, it would be advantageous if such exhaust gases can be disposed to minimize contamination of inhabited areas.

Figure 1:
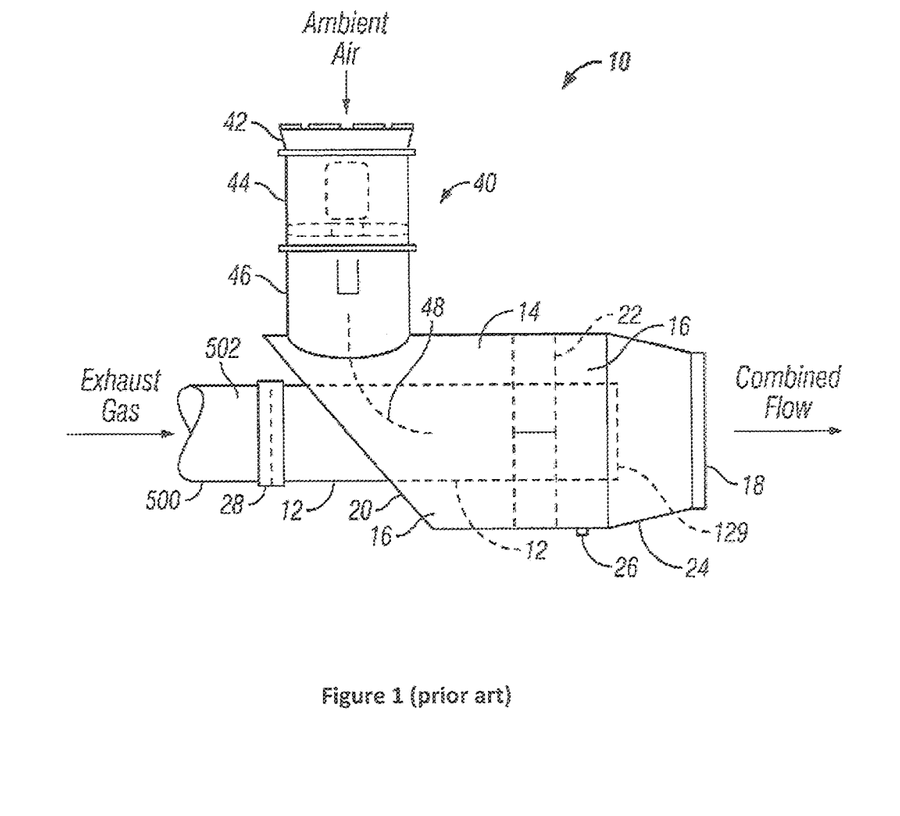
FIG. 1 is a side view of a conventional engine exhaust system according to the prior art.

Conventional efforts to prevent exhaust gases from contaminating inhabited areas include an engine exhaust system 10 as illustrated in FIG. 1. Such systems comprise a housing 14 adapted to encase a terminal portion of an engine exhaust pipe 12. An exit portion 18 and an ambient air pressurization system 40 are coupled to the housing 14 at the same time. The system is arranged such that ambient air injected by the air pressurization system 40 into the housing 14 entrains the exhaust gases discharged from the exhaust pipe to form a combination of fluid. The combined fluid exits the housing 14 through the exit portion 18. However, the introduction of ambient air in such an enclosed arrangement causes disruption to the hot engine gas flow and inevitably creates back-pressure against the internal combustion engine. It follows that back pressure against the internal combustion engine increases with discharge velocity at the exit portion 18.

Such an enclosed arrangement 10 unnecessarily exposes system equipment and engine components to the heat from the internal combustion engine. This increases wear and tear in the equipment and engine components and may lead to higher repair and maintenance cost in the long run.

Further, the engine exhaust pipe 12 and the air pressurization system 40 in the enclosed system 10 are in fluid communication. This encourages the flow of exhaust gas into the air pressurization system 40 when the air pressurization system 40 is not in operation. To keep the engine exhaust system 10 at a sustainable working condition, additional equipment such as non-return dampers and heat resistant components will be required, thus further increasing the working capital and maintenance cost of the engine exhaust system 10.

Therefore, there is a need to develop an invention that addresses the above mentioned short-comings of the conventional engine exhaust system 10.

SUMMARY

In the first aspect the invention provides an exhaust handling system comprising: an exhaust pipe having an exhaust outlet, said exhaust outlet having a nozzle arranged to vent exhaust gas; at least one acceleration jet arranged to project an air flow at a velocity head greater than that of the vented exhaust gas; wherein the at least one acceleration jet and exhaust outlet are positioned to project the air flow so as to impinge on a path of said vented exhaust gas, and consequently transfer velocity head to the vented exhaust gas.

In the second aspect, the invention provides a method of handling engine exhaust gases comprising the steps of: venting exhaust gas; projecting an air flow at a selective velocity head; positioning a flow path of said air flow so as to impinge on a path of said vented exhaust gas; and transferring velocity head to the vented exhaust gas.

The invention therefore provides a means to remove the exhaust gas from the vicinity by imparting a higher velocity head to the gas and so accelerating it to a location distal from human habitation.

Such a method avoids the back pressure issues of the prior art, which include the loss of velocity head through mixing of the ambient air and the exhaust gas.

It will be noted that any system that is directed to diluting the toxic effects of the exhaust gas will, inevitably compromise the permissible concentration for safety operation. By accelerating the gas away from the working space, there is no such compromise as, instead, the toxic fumes are "flushed" away from the vicinity by air accelerating devices.

The air accelerating devices maybe fans, axial, centrifugal or mixed flow blowers. Whichever form the air accelerating devices take, it is required they project the air flow from the respective nozzles at a velocity head greater than the venting exhaust gases.

BRIEF DESCRIPTION OF THE DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

FIGS. 11A to 12D are various mole fraction distribution data based on a study conducted using the setup in FIG. 9.

DETAILED DESCRIPTION

Figure 2:
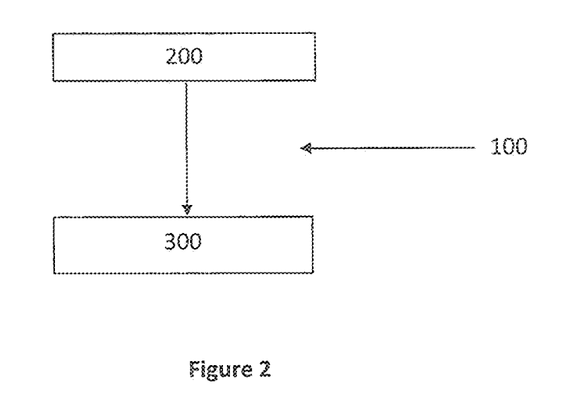
FIG. 2 is a flow chart of a method for handling engine exhaust gases according to one embodiment of the present invention.

FIG. 2 shows a flow chart of a method for handling engine exhaust gases according to one embodiment of the present invention. Here, the method 100 commences with providing 200 at least one acceleration jet arranged to project an air flow at a selective velocity head. Next, the at least one acceleration jet provided 200 is positioned 300 to a terminal portion of an exhaust pipe having an exhaust outlet with a nozzle arranged to vent exhaust gas. It follows that the at least one acceleration jet provided 200 and exhaust outlet are positioned 300 to project an air flow so as to impinge on a path of said vented exhaust gas, and consequently transfer velocity head to the vented exhaust gas. The air flow from the acceleration jet is typically set to be greater than the flow of the vented exhaust gas.

Figure 3A:
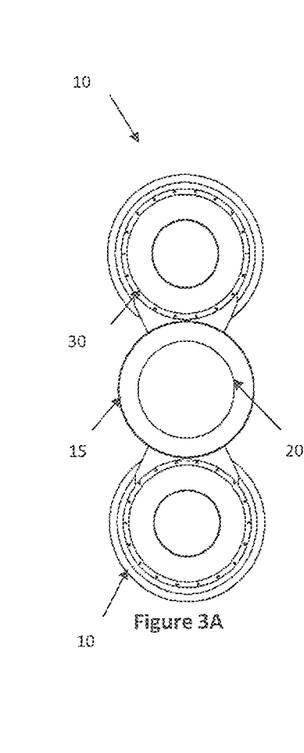
FIGS. 3A to 3B are various views of two acceleration jets positioned around the engine exhaust pipe according to one embodiment of the present invention.
Figure 3B:
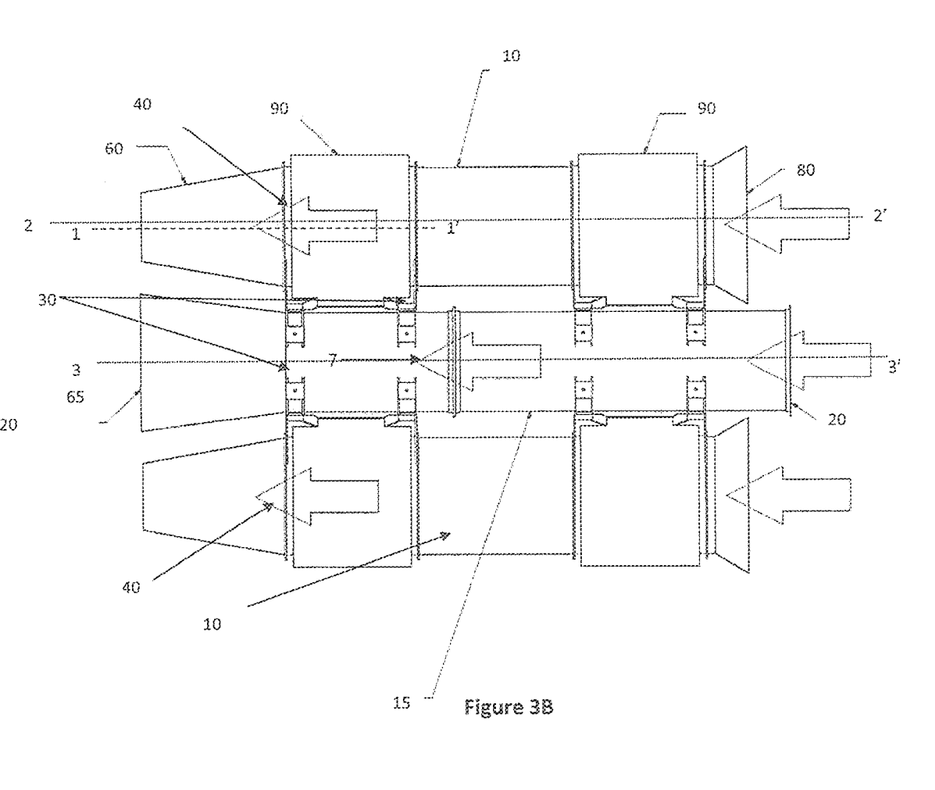

FIGS. 3A and 3B show two acceleration jets 10 positioned around an exhaust gas pipe 20 according to one embodiment of the present invention. Here, each accelerator jet 10 is mounted to a centre pipe 15 which is in turn connected to the terminal portion, or exhaust outlet, of the engine exhaust pipe 20. The accelerator jet 10 may be mounted to the centre pipe 15 according to mounting structures 30 or any other suitable mounting methods according to the prior art. Additional mounting structures may be included to support the structure design of various oil well drilling rigs or production platforms.

The accelerator jet 10 may be a fan or blower driven by any suitable form such as electrical motor, pneumatic motor, hydraulic motor, gas/diesel powered engine, turbine engines or a combination thereof. The fast moving and high velocity jet stream 40 or air flow generated from accelerator jet may be a centrifugal, axial, vane-axial, mixed flow or a combination thereof.

The accelerator jet 10 draws ambient air from the surrounding and discharge the air drawn as high velocity and fast moving jet stream 40. The jet stream 40 discharged from the accelerator jet 10 and exhaust gas 70 discharged from the engine exhaust pipe 20 contact and kinetic energy is transferred from the fast moving jet stream 40 to the slower moving exhaust gas 70 as an increased velocity head. As a result, exhaust gas 70 gains velocity from the kinetic energy transferred to bring it a distance away from the oil well drilling rigs or production platforms.

As discussed, the key inventive concept of the invention is to accelerate the invented exhaust gas so as to remove it from the proximity of the oil platform. As shown in FIGS. 3A and 3B adjacent acceleration jets are provided so as to impinge on the exhaust gas accelerating the exhaust gas. That is to say with a transfer of kinetic energy between the jet streams 40 and the exhaust gas 40, the overall velocity head of the exhaust gas is increased as demonstrated in the velocity profile 41 of FIG. 4.

Figure 4:
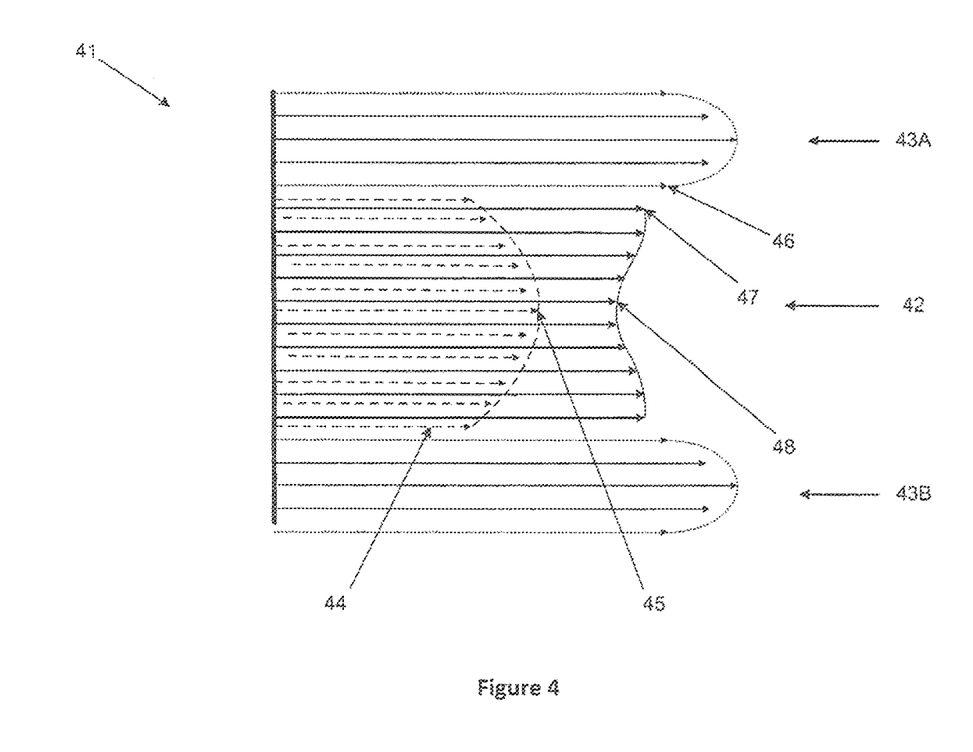
FIG. 4 is a velocity profile of the high velocity jet streams and exhaust gas according to one embodiment of the present invention.

Here, the velocity profile of the acceleration jets 43A, 43B have an interface 46, 47 which imparts the kinetic energy through friction due to the differential speed 46 of the acceleration jet and the exhaust gas 47.

The velocity profile 42 of the acceleration exhaust gas can then be compared to the velocity profile 44 of the exhaust gas in an unaccelerated condition. The maximum velocity 45 of the unaccelerated exhaust gas is therefore substantially below the velocity 47, 48 of the accelerated exhaust gas.

With regard to the design of the engine exhaust pipe 20, it will be appreciated that the engine exhaust pipe 20 can be either straight or flanged. Depending on the design requirements, diverging nozzles may be used at the exit portion of the engine exhaust pipe 20 to minimize outlet pressure loses. On the contrary, converging nozzles may be used if a higher exhaust gas 70 velocity is desired. Further, the shape of the exhaust nozzle 65 may be of various shapes including round, oval, square, rectangular or ellipse.

The velocity head of the jet stream, or projected air flow, 40 may be manipulated according to design requirements in a number of ways and will be discussed in detail below.

In one embodiment of the present invention, the accelerator jet 10 may include a converging (narrowing down from a wide diameter to a smaller diameter in the direction of the flow) nozzle 60 at the exit portion of the accelerator jet 10. The converging nozzle 60 serves to concentrate and increase the velocity of the ambient air discharged from accelerator jet 10. It will be appreciated that the shape of the nozzle 60 may be of various shapes including round, oval, square, rectangular or ellipse.

The embodiment as shown in FIGS. 3A and 3B show converging nozzle 60 having a longitudinal axis 1-1' parallel to the longitudinal axis 2-2' of the accelerator jet 10. In a further embodiment, arrangements of the converging nozzle 60 may be used to make fine adjustments to the velocity and point of convergence of the jet streams 40. In particular, the embodiment illustrated in 5A and 5B has converging nozzles 60 with a longitudinal axis 5-5' arranged at an angle relative to the longitudinal axis 2-2' of the accelerator jet 10. The angled arrangement of the converging nozzle 60 draws the point of convergence for the jet stream 40 and exhaust gas 70 closer to the exit portion of the accelerator jet 10 and exhaust gas pipe 20. As a result, jet stream 40 and exhaust gas 70 converges earlier to facilitate the transfer of kinetic energy needed for the acceleration of exhaust gas 70.

Figure 5A:
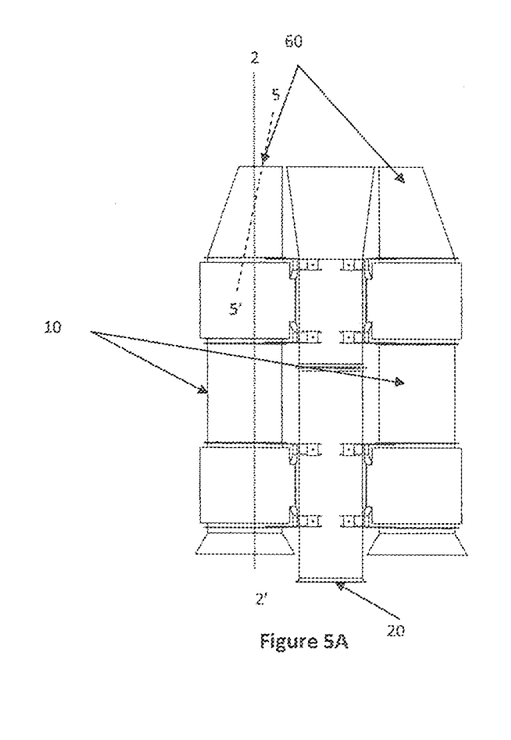
FIGS. 5A and 5B are various views of two accelerator jets positioned around the engine exhaust pipe according to a further embodiment of the present invention.
Figure 5B:
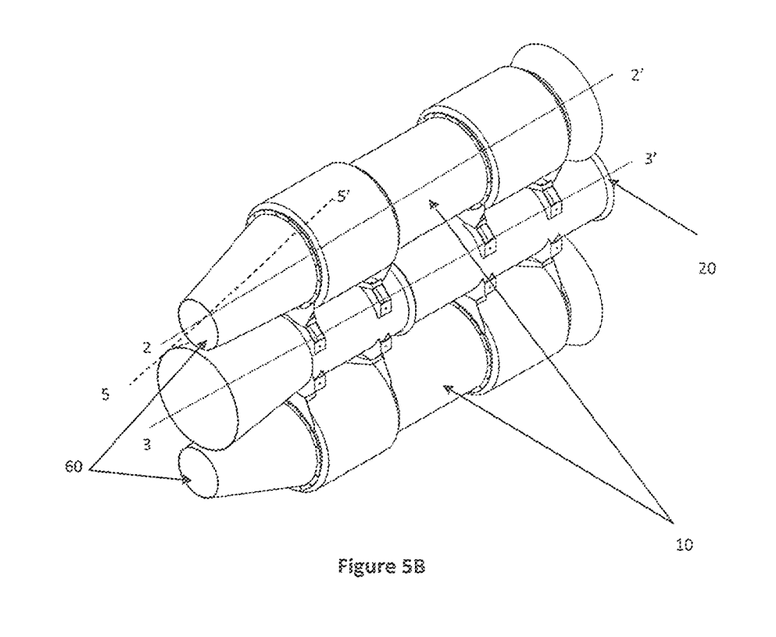
Figure 6A:
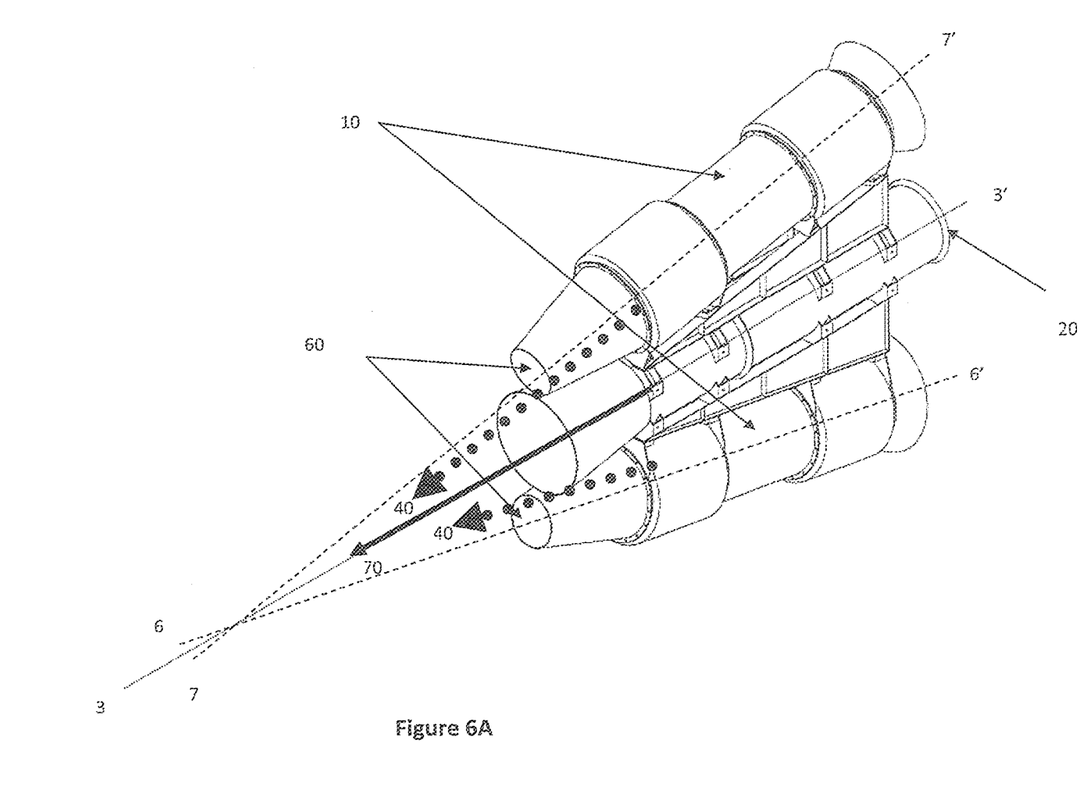
FIGS. 6A and 6B are various views of two accelerator jets positioned around the engine exhaust pipe according to a further embodiment of the present invention.
Figure 6B:
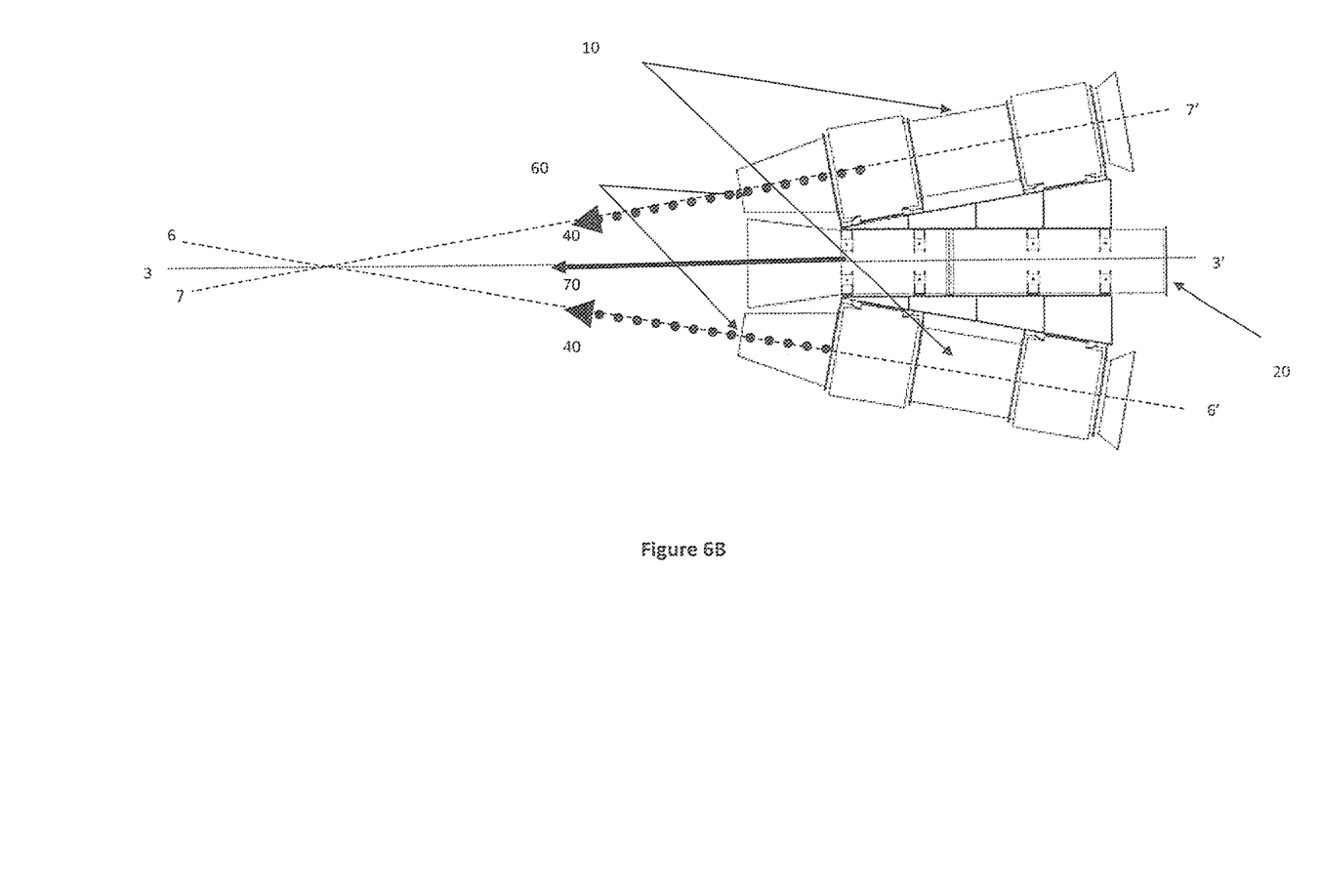

Further, the acceleration jets 10 as shown in FIGS. 6A and 6B may replace the accelerator jets as shown in FIGS. 5A and 5B. As with the previous embodiments, the accelerator jet 10 has a longitudinal axis 2-2' parallel to the longitudinal axis 3-3' of the centre pipe 15 and exhaust gas pipe 20. The acceleration jets 10 as shown in FIGS. 6A and 6B are positioned such that it's longitudinal axis 6-6', 7-7' is angled relative to the longitudinal axis 3-3' of the exhaust gas pipe 20. Thus, the ability to direct and focus the jet stream 40 towards the exhaust gas 70 enhances the transfer of kinetic energy needed for the acceleration of exhaust gas 70.

Figure 7:
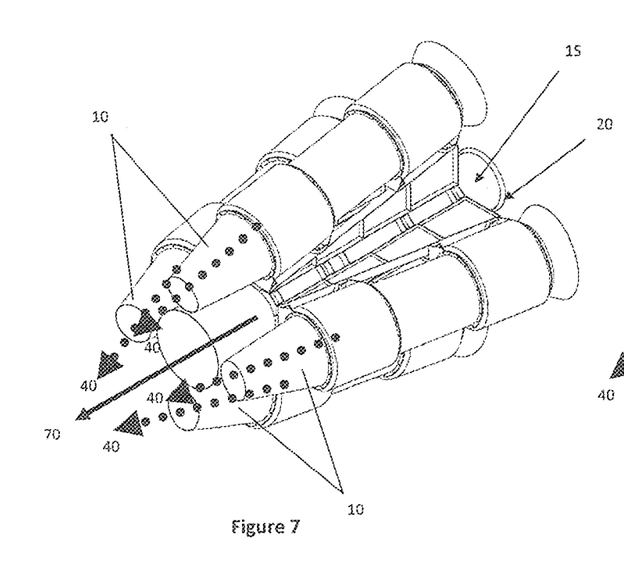
FIGS. 7 and 8 are isometric views of one or multiple accelerator jets positioned around the engine exhaust pipe according to a further embodiment of the present invention.
Figure 8:
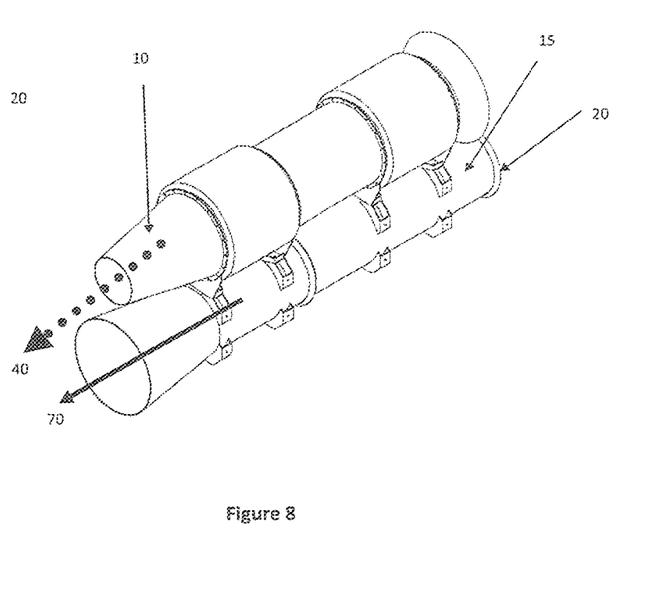

Single or multiple acceleration jets 10 can be selectively mounted to the centre pipe 15 to manipulate the velocity of the jet stream 40. For instance, if a jet stream 40 with a higher velocity is desired, four instead of two acceleration jets 10 may be mounted to the centre pipe 15. The four acceleration jets 10 may be arranged to surround the exhaust pipe 20 such that the exhaust pipe 20 forms the centre piece. This arrangement is illustrated in FIG. 7. FIG. 8 illustrates a single accelerator jet 10 and exhaust pipe arrangement. In this case, velocity from a single accelerator jet 10 works to sufficiently accelerate the exhaust gas 70 to remove it from the proximity of the oil platform.

It will be appreciated that embodiments as discussed may include:

An inlet cone or bell 80 may be fitted to the intake portion of the acceleration jet 10 to smoothen (that is, reduce turbulence) within the flow of the ambient air intake;

Protection members such as louvres, mesh, guard or any suitable form of hood may be fitted to the intake portion of the acceleration jet 10 to prevent foreign objects from entering the acceleration jet 10;

Heating elements may be fitted to the louver, mesh, guard or any form of suitable hood to maintain temperature of the acceleration jet and specifically to prevent frosting during cold weather;

Sound attenuation device 90 may be added to either the intake and/or the exit portion of the acceleration jet 10 to attenuate the noise level;

Vibration isolating device may be added between the centre of the acceleration jet 10 and engine exhaust pipe 20 to isolate the exhaust handling system from sources of vibration; and Straightening vanes may be added to the exit portion of the engine exhaust pipe 20 and acceleration jets 10 to help guide the exhaust gas 70 and jet stream 40 respectively to desired locations.

Computational fluid dynamics (CFD) simulations were conducted to study the interaction between the jet streams from the acceleration jets and the vented exhaust gas. In this study, CFD simulations were conducted by solving Navier-Stokes equation with standard k-ε turbulence model. The equations solved within the flow domain during each CFD simulation run includes: 1) continuity equations; 2) momentum equations; 3) energy equations; and 4) species transport equations. It follows that continuity and momentum equations determine flow field profiles; energy equations determine temperature distribution; and species transport equations determine concentration distribution.

Figure 9:
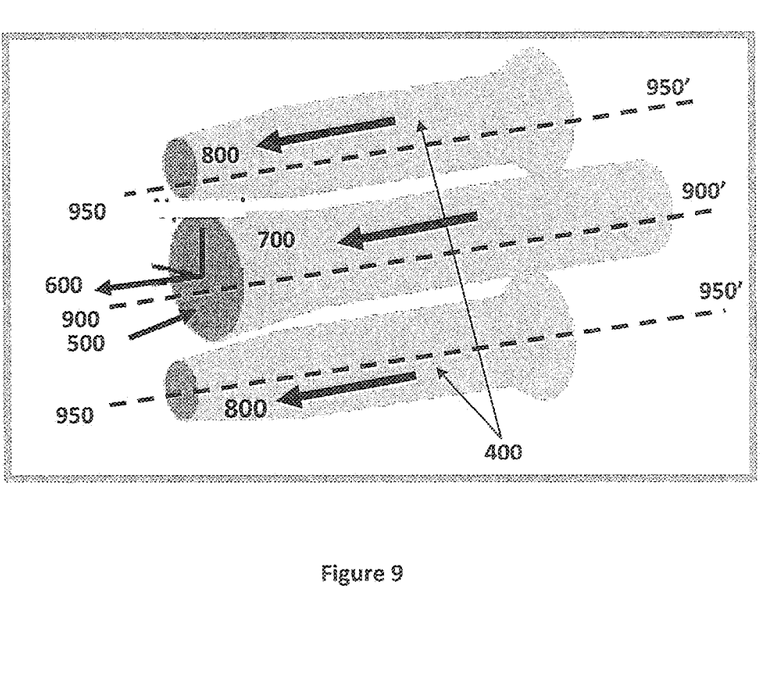
FIG. 9 is a simulation setup used for a study conducted on various embodiments of the present invention.

The setup in this study, as illustrated in FIG. 9, involved two identical acceleration jets 400 according to one embodiment of the present invention previously discussed. The acceleration jets 400 guide vented exhaust gas 700 away from the exhaust pipe opening 500 in the forward direction 600. The acceleration jets 400 were positioned on diametrically opposed sides of the exhaust pipe opening 500. Two analyses conducted in this study will be discussed in detail below.

In the first analysis, the contour plots for velocity flow and mole fraction distribution of $CO_2$ or the exhaust concentration profiles for two exhaust pipes with different geometrical openings were considered. The first exhaust pipe had a circular geometrical opening with a radius of 0.576 meters (m) and surface area of 1.04 m². The second exhaust pipe had an elliptical opening with a vertical axis of 0.711 m, a horizontal axis of 0.457 m and surface area of 1.02 m². Further, the acceleration jets 400 are arranged such that the high velocity jet streams 800 are parallel to the vented exhaust gas path 900-900'.

Following the first analysis, the first exhaust pipe with circular opening was put through a second analysis. In the second analysis, the two acceleration jets 400, as seen in FIG. 9, remained on diametrically opposed sides of the exhaust pipe opening 500. The mole fraction distribution of $CO_2$ or the exhaust concentration profiles for jet streams projected at various angles were examined. The jet streams were projected as follows: 1) jet streams are parallel to the longitudinal axes of the vented-exhaust gas path 900-900' (similar to first analysis conducted on exhaust pipe with circular opening); 2) longitudinal axes of jet streams 950-950' are inclined at 5 degrees from the longitudinal axis of the vented exhaust gas path 900-900'; and 3) longitudinal axes of jet streams 950-950' are inclined at 10 degrees from the longitudinal axis of the vented exhaust gas path 900-900'.

Figure 10A:
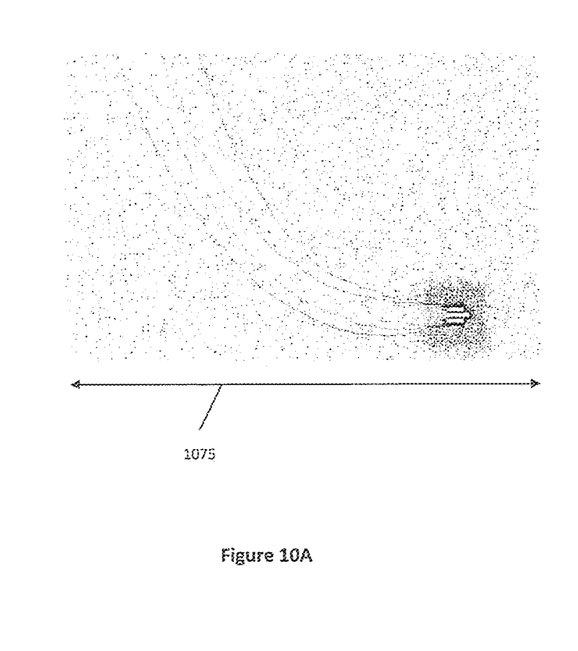
FIGS. 10A to 10D are various CFD images from the study conducted using the setup in FIG. 9.
Figure 10B:
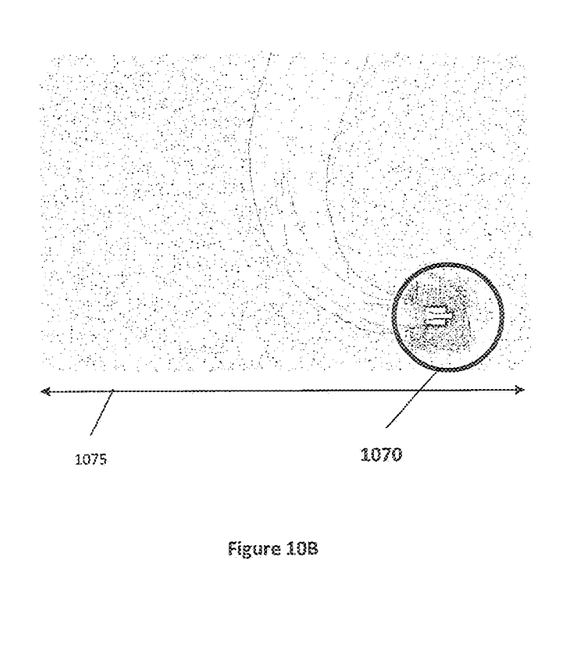

FIGS. 10A to 10B are CFD images from the first analysis. The images show the contour plots for velocity flow of the two exhaust pipes with different geometrical opening's. FIG. 10A represents the velocity flow of the jet streams and vented exhaust gas from the first exhaust pipe with circular opening. FIG. 10B represents the velocity flow of the jet streams and vented exhaust gas from the second exhaust pipe with elliptical opening. The length 1075 of the CFD images in FIGS. 10A and 10B correspond to the length of the computation domain and measures approximately 200 m.

In comparison with the velocity contours in FIG. 10B, it is clear based on the velocity contours in FIG. 10A that vented exhaust gas is directed further away from the exhaust. The velocity contours in FIG. 10B remain at a considerably close distance from the exhaust pipe. Further, there appears to be a velocity bubble surrounding the acceleration jets and exhaust gas region 1070 in FIG. 10B. This suggests that vented exhaust gas may be trapped around region 1070 instead of being accelerated away from the exhaust pipe.

Figure 10C:
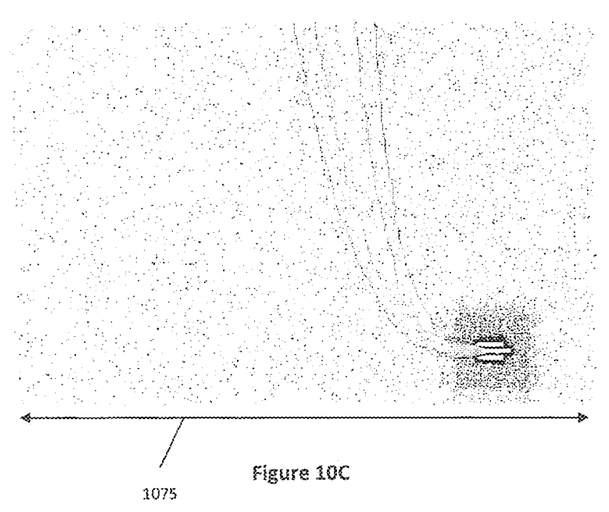

FIG. 10C represents the contour plots of velocity flow for the jet streams and vented exhaust gas when both acceleration jets 400 are not in operation.

Figure 10D:
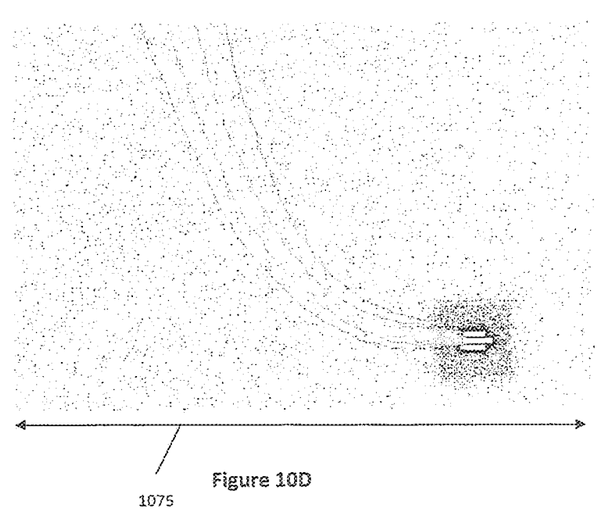

FIG. 10D illustrates the contour plots of velocity flow for the jet streams and vented exhaust gas when only the top acceleration jet is in operation.

Figures 11A, 11B:
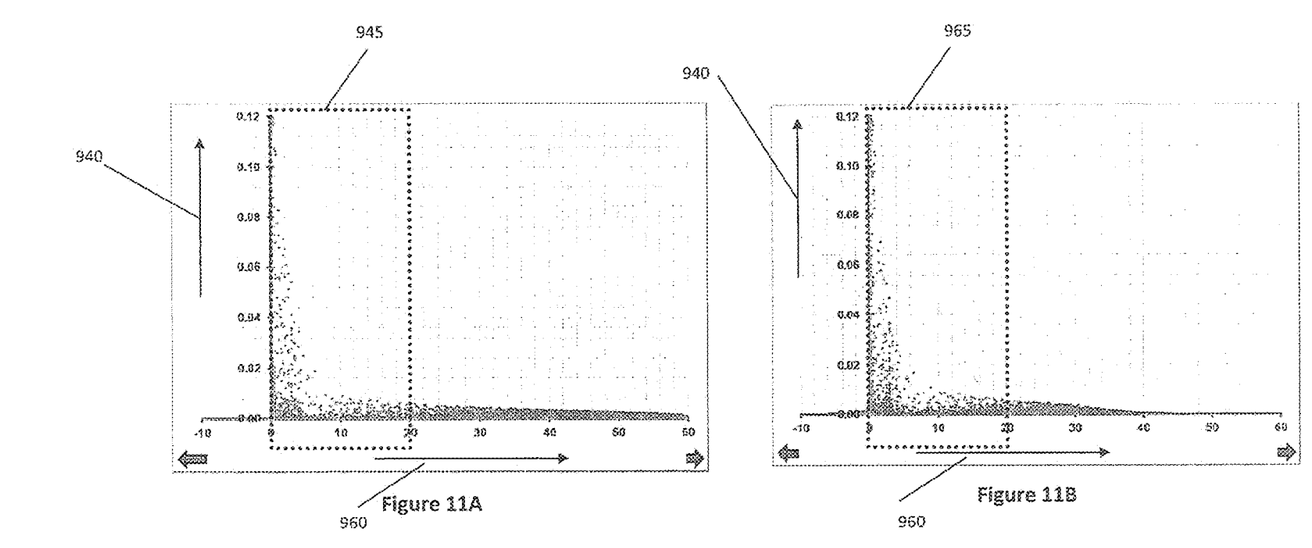

FIGS. 11A and 11B represent the mole fraction distribution of $CO_2$ or vented exhaust gas concentration profile for the first and second exhaust pipes. The mole fraction distribution of $CO_2$ 940 is recorded with respect to the forward distance in meters 960 from the centre of the exhaust gas pipe. In FIG. 11A, less $CO_2$ mole fractions 945 were recorded between 0 m to 20 m from the centre of the exhaust pipe. This observation is made relative to the $CO_2$ mole fractions 965 recorded between 0 m to 20 m from the centre of the exhaust pipe in FIG. 11B. This suggests that a lower concentration of vented exhaust gas is present close to the exhaust gas pipe in the setup with circular opening compared to the elliptical opening. Further, $CO_2$ mole fractions were recorded up to 60 meters from the exhaust gas pipe in FIG. 11A while records of $CO_2$ mole fractions terminated at around 40 meters from the exhaust pipe in FIG. 11B. In view of the results above, an exhaust pipe with a circular opening may be useful in enhancing the distance traveled by the accelerated exhaust gas. It will be appreciated that the exhaust pipe may have openings of various shapes including circular, elliptical, square or rectangular depending on the design requirements. Therefore, any geometry suitable for venting exhaust gas may be applied in the present invention.

Figure 12A:
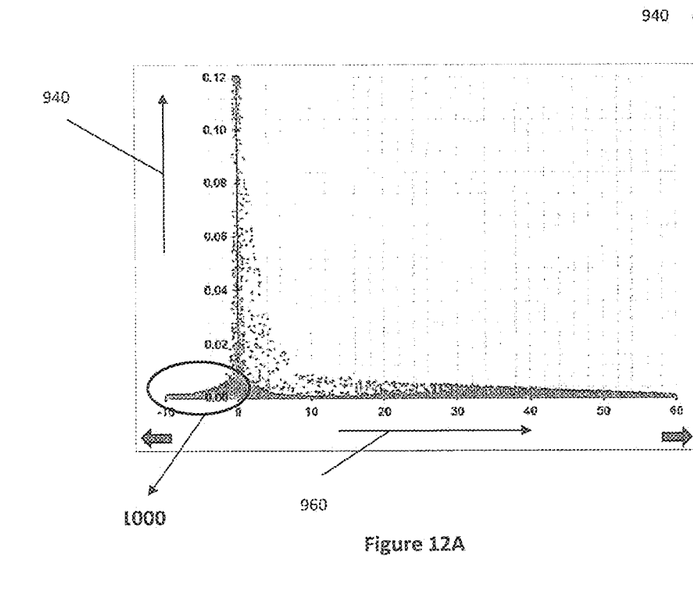
Figure 12B:
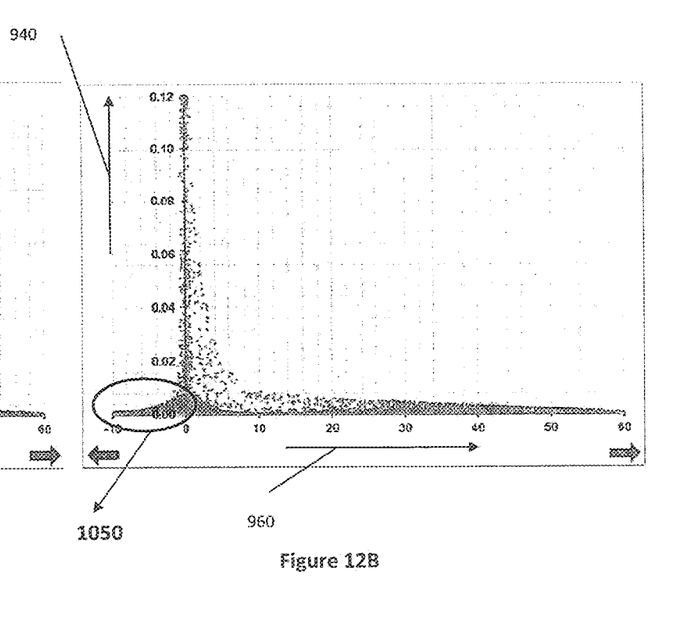

FIGS. 12A and 12B illustrate the mole fraction distribution of $CO_2$ or vented exhaust gas concentration profile recorded for the first exhaust gas pipe with jet streams projected at various angles. FIG. 12A represents the exhaust gas concentration profile for jet streams projected at 5 degrees from the vented exhaust gas path 900-900'. FIG. 12B represents the exhaust gas concentration profile for jet streams projected at 10 degrees from the vented exhaust gas path 900-900'. FIG. 11A as mentioned previously shows the exhaust gas concentration profile for jet streams parallel to the vented exhaust gas path 900-900'. Contrary to FIG. 11A, the profiles as seen in FIGS. 12A and 12B suggest some degree of exhaust gas backflow 1000, 1050. In view of the above results, jet streams parallel to the vented exhaust gas path 900-900' may be useful in enhancing the distance traveled by the accelerated exhaust gas. It will be appreciated that the jet streams may be projected at various angles from the vented exhaust gas path 900-900' depending on the design requirements. Therefore, any jet stream projections suitable for accelerating exhaust gas may be applied in the present invention.

Figures 12C, 12D:
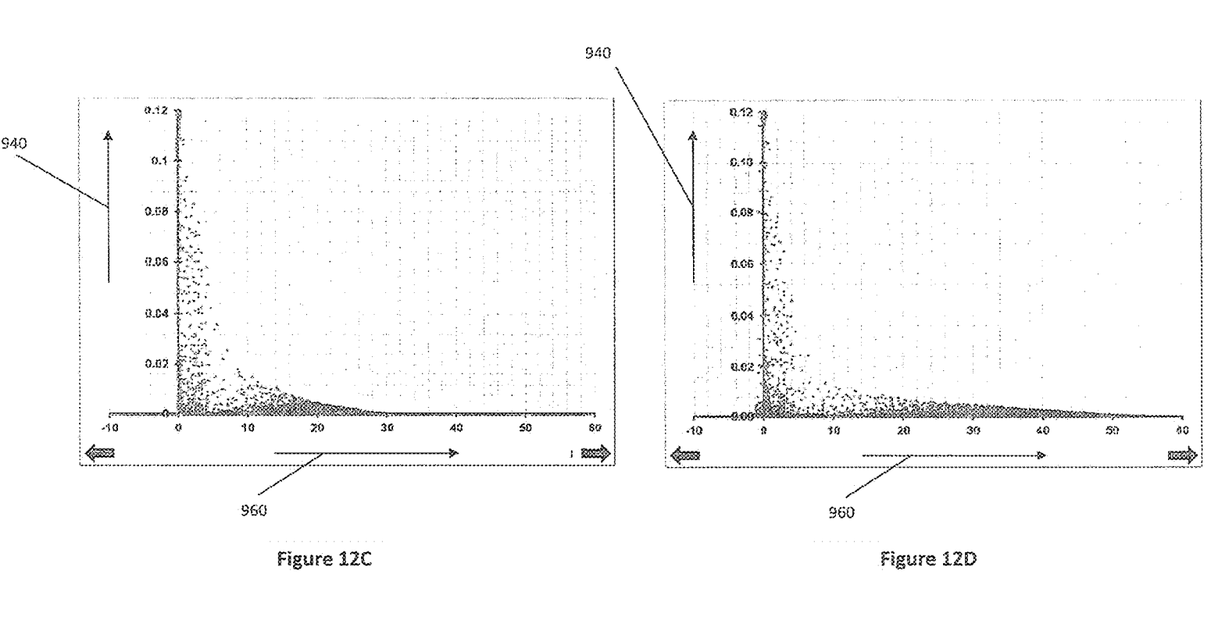

FIG. 12C represents the mole fraction distribution of $CO_2$ recorded when both acceleration jets are not in operation. FIG. 12D represents the mole fraction distribution of $CO_2$ recorded when only the top acceleration jet is in operation.

The invention claimed is:

1. An exhaust handling system comprising:
   an exhaust pipe having an exhaust outlet, said exhaust outlet having a nozzle arranged to vent exhaust gas;
   two acceleration jets positioned on diametrically opposed sides of the exhaust outlet, and arranged to project an air flow at a velocity head greater than that of the vented exhaust gas;
   wherein the at least one acceleration jet and exhaust outlet are positioned to project the air flow so as to impinge on a path of said vented exhaust gas, and consequently transfer velocity head to the vented exhaust gas so as to accelerate the vented exhaust gas; and
   wherein the nozzle has a longitudinal axis parallel to a longitudinal axis of the accelerator jet.

2. The exhaust handling system according to claim 1, wherein the air flow path is parallel to the exhaust gas path with impingement of said exhaust gas as a result of an expansion plume of said air flow and exhaust gas.

3. The exhaust handling system according to claim 1, wherein the air flow path intersects the flow path of said exhaust gas.

4. The exhaust handling system according to claim 1, wherein there is a plurality of acceleration jets positioned on circumferentially about the exhaust outlet.

5. The exhaust handling system according to claim 4, wherein there is four acceleration jets positioned circumferentially about the exhaust outlet.

6. The exhaust handling system according to claim 1, wherein longitudinal axes of said acceleration jets are inclined to the flow path of said vented exhaust gas.

7. The exhaust handling system according to claim 1, wherein the at least one acceleration jet includes an inlet cone at an intake portion, said inlet cone arranged to reduce turbulent flow at said intake portion.

8. The exhaust handling system according to claim 1, wherein the acceleration jet includes a protective member at an intake portion, said protective member arranged to block the entry of foreign objects into the acceleration jet.

9. The exhaust handling system according to claim 8, wherein said protective member includes a heating element to maintain the temperature of said acceleration jet.

10. The exhaust handling system according to claim 1, wherein said acceleration jets include a sound attenuation device.

11. The exhaust handling system according to claim 1, wherein said acceleration jets include a vibration isolating device.

12. The exhaust handling system according to claim 11, wherein said vibration isolating device is positioned at a centre of the acceleration jet and engine exhaust pipe and arranged to isolate the exhaust handling system from sources of vibration.

13. The exhaust handling system according to claim 1, wherein the exhaust outlet includes vanes to control the flow path of the exhaust gas.

14. The exhaust handling system according to claim 1, wherein the acceleration jets include vanes to control the flow path of the accelerated air flow.

15. The exhaust handling system according to claim 1, wherein the nozzle of the exhaust pipe is circular.

16. A method of handling engine exhaust gases via an exhaust handling system according to claim 1, the method comprising the steps of:
    venting exhaust gas from the nozzle;
    projecting the air flow at the selective velocity head from the two accelerator jets positioned on diametrically opposed sides of the nozzle;
    positioning the flow path of said air flow so as to impinge on the path of said vented exhaust gas; and
    transferring velocity head to the vented exhaust gas so as to accelerate the vented exhaust gas.

17. The method according to claim 16, wherein the air flow path is parallel to the exhaust gas path with impingement of said exhaust gas as a result of an expansion plume of said air flow and exhaust gas.

18. The method according to claim 16, wherein the air flow path intersects the flow path of said exhaust gas.

19. The method according to claim 16, wherein a longitudinal axis of said air flow path is inclined to a longitudinal axis of said vented exhaust gas path.

* * * * *